(12) United States Patent
Takemura et al.

(10) Patent No.: US 7,243,529 B2
(45) Date of Patent: Jul. 17, 2007

(54) KNOCK DETECTING APPARATUS FOR INTERNAL COMBUSTION ENGINE

(75) Inventors: Yuichi Takemura, Anjo (JP); Masaomi Inoue, Kariya (JP); Kenji Kasashima, Nishikamo-gun (JP)

(73) Assignees: DENSO Corporation, Kariya (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/866,248

(22) Filed: Jun. 14, 2004

(65) Prior Publication Data

US 2005/0000272 A1    Jan. 6, 2005

(30) Foreign Application Priority Data

Jul. 3, 2003    (JP) ............................. 2003-270560

(51) Int. Cl.
    *G01L 23/22*    (2006.01)
(52) U.S. Cl. .................................... 73/35.09
(58) Field of Classification Search ............... 73/35.01, 73/35.03, 35.04, 35.09, 117.2, 117.3
    See application file for complete search history.

(56) References Cited

U.S. PATENT DOCUMENTS

| | | | | |
|---|---|---|---|---|
| 4,478,086 A | * | 10/1984 | Gram | 73/781 |
| 4,617,895 A | | 10/1986 | Sakakibara et al. | 123/406.38 |
| 4,625,691 A | * | 12/1986 | Komurasaki et al. | 123/406.33 |
| 4,637,245 A | * | 1/1987 | Iwata et al. | 73/35.03 |
| 5,027,775 A | * | 7/1991 | Iwata | 123/406.21 |
| 5,088,044 A | * | 2/1992 | Matsuura | 701/111 |
| 5,230,316 A | * | 7/1993 | Ichihara et al. | 123/406.38 |
| 5,287,837 A | | 2/1994 | Hashimoto et al. | 123/406.29 |
| 5,925,819 A | * | 7/1999 | Yoshinaga et al. | 73/117.3 |
| 6,082,187 A | * | 7/2000 | Schricker et al. | 73/116 |
| 6,199,007 B1 | * | 3/2001 | Zavarehi et al. | 701/111 |
| 6,427,662 B2 | * | 8/2002 | Tanaya et al. | 123/406.29 |
| 6,505,606 B2 | * | 1/2003 | Lodise et al. | 123/406.21 |
| 6,520,149 B2 | | 2/2003 | Kokubo et al. | 123/406.37 |
| 6,750,798 B2 | * | 6/2004 | Honda | 341/155 |
| 6,912,460 B2 | * | 6/2005 | Sauler et al. | 701/114 |
| 6,923,046 B2 | * | 8/2005 | von Glowczewski et al. | 73/115 |
| 2001/0015198 A1 | | 8/2001 | Kokubo et al. | 123/406.37 |
| 2001/0052336 A1 | * | 12/2001 | Tanaya et al. | 123/406.29 |
| 2002/0029105 A1 | * | 3/2002 | Sauler et al. | 701/111 |

(Continued)

FOREIGN PATENT DOCUMENTS

EP    0 416 559 B1    3/1991

(Continued)

*Primary Examiner*—Hezron Williams
*Assistant Examiner*—Tamiko Bellamy
(74) *Attorney, Agent, or Firm*—Nixon & Vanderhye P.C.

(57) ABSTRACT

A waveform knock signal detected by a knock sensor is filtered through a band-pass filter. The detected wave form signal is compared with an ideal reference knock waveform to determine an engine knock. The ideal reference knock waveform is derived on the basis of a factor depending on a crank angle, a factor depending on a real time and a factor depending on an engine construction. The factor depending on the real time is calculated based on an energy loss in a combustion chamber and a time constant of the band-pass filter. The factor depending on the engine construction is calculated based on a knock vibration which is generated in a cylinder, transferred to a cylinder block and detected by the knock sensor.

27 Claims, 4 Drawing Sheets

U.S. PATENT DOCUMENTS

2002/0088432 A1* 7/2002 Lodise et al. .......... 123/406.29
2004/0118182 A1* 6/2004 Glowczewski et al. .... 73/35.09

FOREIGN PATENT DOCUMENTS

| EP | 0 732 573 B1 | 9/1996 |
| JP | 60243369 A | 12/1985 |
| JP | 8-19890 | 3/1996 |
| JP | 08319879 A * | 12/1996 |

* cited by examiner

KNOCK DETECTING APPARATUS FOR INTERNAL COMBUSTION ENGINE

CROSS REFERENCE TO RELATED APPLICATION

This application is based on Japanese Patent Application No. 2003-270560 filed on Jul. 3, 2003, the disclosure of which is incorporated herein by reference.

FIELD OF THE INVENTION

The present invention relates to a knock detecting apparatus for an internal combustion engine.

BACKGROUND OF THE INVENTION

A knock detecting apparatus, as shown in JP-6-60621B, has a knock sensor disposed on a cylinder block of an engine. The knock sensor detects a knock vibration and outputs a knock signal. Knock frequency components corresponding to the engine knock are derived from the knock signal by a band-pass filter. A peak value of the knock frequency components is detected by a peak-hold circuit, and then the peak value is compared with a knock determining level to determine a presence or absence of the engine knock. Alternately, the knock frequency components in a predetermined range are integrated, and the integrated value is compared with the knock determining level.

However, the frequency band generated by the engine knock is not always the same. The frequency band having a high vibration intensity is different every engine knock. Thus, when the only one of frequency band is determined and when the determined frequency band has a lower vibration intensity than the other frequency band, the engine knock can not be detected.

When an electric and/or mechanical noise occurs in the frequency band near the knock frequency components and when the knock determination is performed only from the peak value or integrated value of a knock frequency components, then an electric and/or mechanical noise may be superposed on the derived knock frequency components, and then the noise is determined mistakenly as the engine knock.

On the other hand, JP-2001-227400A shows that the knock determination is executed on the basis of the relation between the peak value in the knock frequency components and the vibration period. However, in such a knock determination, when multiple noises are superposed on the knock frequency components, it is hardly distinguish the engine knock from the noises in order to detect the engine knock correctly.

SUMMARY OF THE INVENTION

An object of the present invention is to provide a knock detecting apparatus for an internal combustion engine which can detect an engine knock precisely.

According to the present invention, the knock detecting apparatus has a combustion condition detecting means for outputting a waveform signal indicative of a combustion condition of the engine, a calculating means for calculating an ideal reference knock waveform, and a knock determining mean for evaluating a relation between the waveform signal and the ideal reference knock waveform to determine an engine knock. The calculating means calculates the ideal reference knock waveform on the basis of a factor depending on a crank angle and a factor depending on a real time. The output waveform signal is different from the ideal reference knock waveform when a noise is superposed on the output waveform signal. Therefore, by comparing the output waveform signal with the ideal reference knock waveform, it is avoided that a noise is determined as an engine knock mistakenly.

A knock vibration attenuates according to a decrease of cylinder pressure. The cylinder pressure changes according to a crank angle and a real time elapsed. Thus, in the present invention, the ideal reference knock waveform is derived in the manner described above.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENT

An embodiment of the present invention will be described hereinafter with reference to the drawings.

Figure 1:
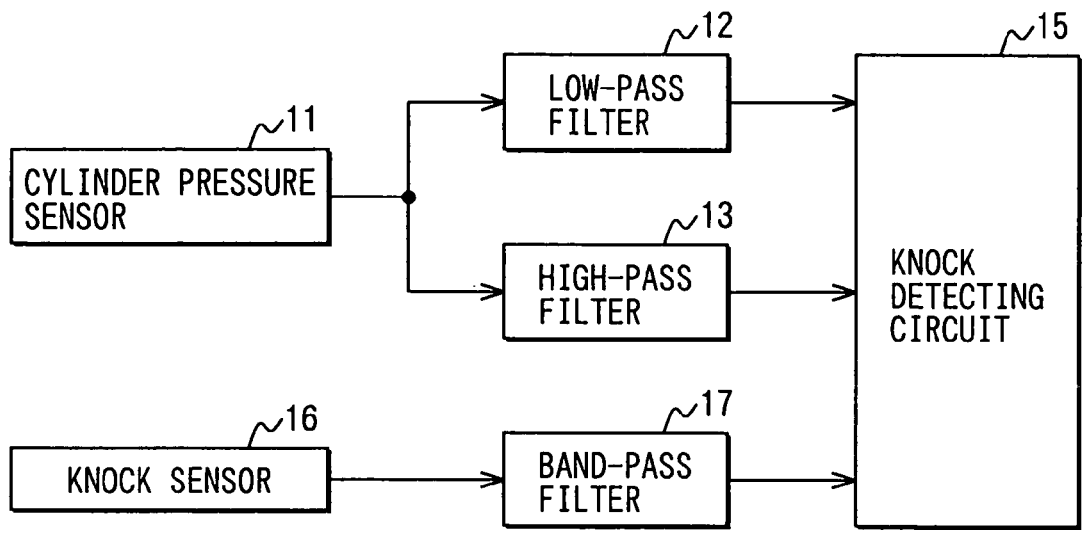
FIG. 1 is a schematic block diagram of a knock detecting apparatus according to an embodiment of the invention.

FIG. 1 shows a system of a knock detecting apparatus mounted on a vehicle. A cylinder pressure sensor 11 is disposed at a predetermined cylinder. The cylinder pressure sensor 11 outputs a waveform signal indicative of a condition of combustion. The sensor 11 can be of a type integrated with a spark plug or can be of a type having a sensing portion toward a combustion chamber. A low-pass filter 12 and a high-pass filter 13 receive the waveform signal and output the signal to a knock detecting circuit 15.

The signal from the cylinder pressure sensor 11 includes a signal indicative of a change of a piston movement and a change of cylinder pressure, and also includes a high-frequency noise. The low-pass filter 12 removes the high-frequency noise, which is noise of 100 to 1000 Hz, in order to detect pressure changes in the cylinder precisely.

The high-pass filter 13 derives a pressure vibration wave signal from the output signal, the pressure vibration wave signal being due to the engine knock. A resonance frequency due to the engine knock depends on a bore of the engine and is the frequency of above 5 kHz. Thus, it is desirable that the high-pass filter removes a signal of 3 kHz to 5 kHz in order to derive the pressure vibration wave signal precisely.

A knock sensor 16 is disposed on a cylinder block of the engine to detect a vibration of the cylinder block. An output signal from the knock sensor 16 is received by the knock detecting circuit 15 through a band-pass filter 17. The band-pass filter 17 derives a specific frequency signal of the knock from the output signal of knock sensor 16.

The knock detecting circuit 15 has a microcomputer which executes routines described below and which compares the waveform of the signal passed through the band-pass filter 17 with a waveform of the ideal reference knock signal in order to detect occurrence of the engine knock. The signal passed through the band-pass filter 17 is referred to as a knock sensor signal herein after.

The way of deriving the ideal reference knock waveform is described hereinafter. The ideal reference knock waveform is derived on the basis of a factor depending on a crank angle (crank angle term Kca), a factor depending on a real time (real time term Kt), and a factor depending on an engine construction (vibration transfer function Gcy).

The knock of engine is a phenomenon in which a resonance of the pressure wave in the cylinder occurs. An attenuate ratio of the pressure wave has a correlation to an attenuate of cylinder pressure in a power stroke. Thus, the ideal waveform is derived based on the attenuate of cylinder pressure in the power stroke. The accuracy of detecting the engine knock is improved by comparing the waveform of the knock sensor signal with the ideal waveform. Furthermore, since the attenuate of cylinder pressure is defined on the crank angle as a parameter, the attenuate of cylinder pressure is used as the crank angle term Kca to calculate the ideal waveform.

The factor depending on the real time (real time term Kt) is based on an energy loss in the combustion chamber and a time constant (delay of response) of the band-pass filter 17. The energy loss of combustion chamber is comprised of viscous friction loss and cooling loss by heat transfer to the cylinder block. These loss vary according to the real time, thus the energy loss in the combustion chamber can be used as the factor depending on the real time. By applying the energy loss in the combustion chamber to the ideal waveform, more practical ideal waveform is derived. The band-pass filter 17 has a delay of response which is also factor depending on the real time. Since the waveform of knock sensor signal is altered according to the time constant of the band-pass filter 17, the ideal waveform is derived accurately by applying the time constant of the band-pass filter 17 to the ideal wave shape.

The factor depending on the engine construction (vibration transfer function Gcy) is based on an effect of knock vibration which is transferred to the cylinder block and is detected by the knock sensor 16. By deriving the ideal waveform with considering the effect of the vibration transfer series, the ideal waveform is derived accurately and a deterioration of accuracy of detecting engine knock can be restricted.

Referring to FIGS. 2 to 7, process of each routine is described herein after.

(Calculating of the Crank Angle Term Kca)

Figure 2:
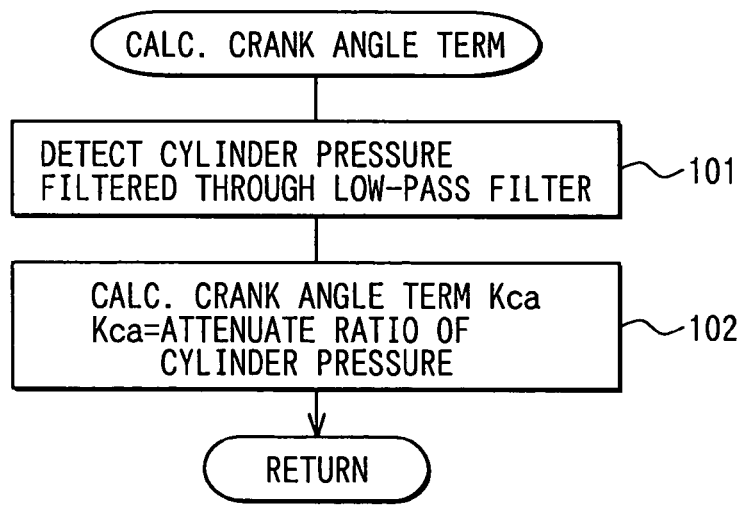
FIG. 2 is a flowchart showing a process of a crank angle term calculation routine.

Referring to FIG. 2, at step 101, the cylinder pressure sensor signal is read and the wave shape of the cylinder pressure sensor signal during the power stroke is detected in order to derive an attenuate of the cylinder pressure during the power stroke. The high frequency noise is removed from the cylinder pressure sensor by the low-pass filter 12.

After step 101, the process advances to step 102 in which the attenuate ratio of the waveform of the cylinder pressure sensor during the power stroke is calculated to set the attenuate ratio as the crank angle term Kca. The cylinder pressure logarithmically attenuates against the crank angle during the period of engine knock, which is generally corresponds ATDC 20° CA to 90° CA. Therefore, the crank angle term Kca is determined according to the logarithmic attenuate ratio.

Since the crank angle term Kca changes according to the engine speed or the engine load, the crank angle term Kca can be calculated every engine speed or every engine load.

(Calculating the Real Time Term Kt)

Figure 3:
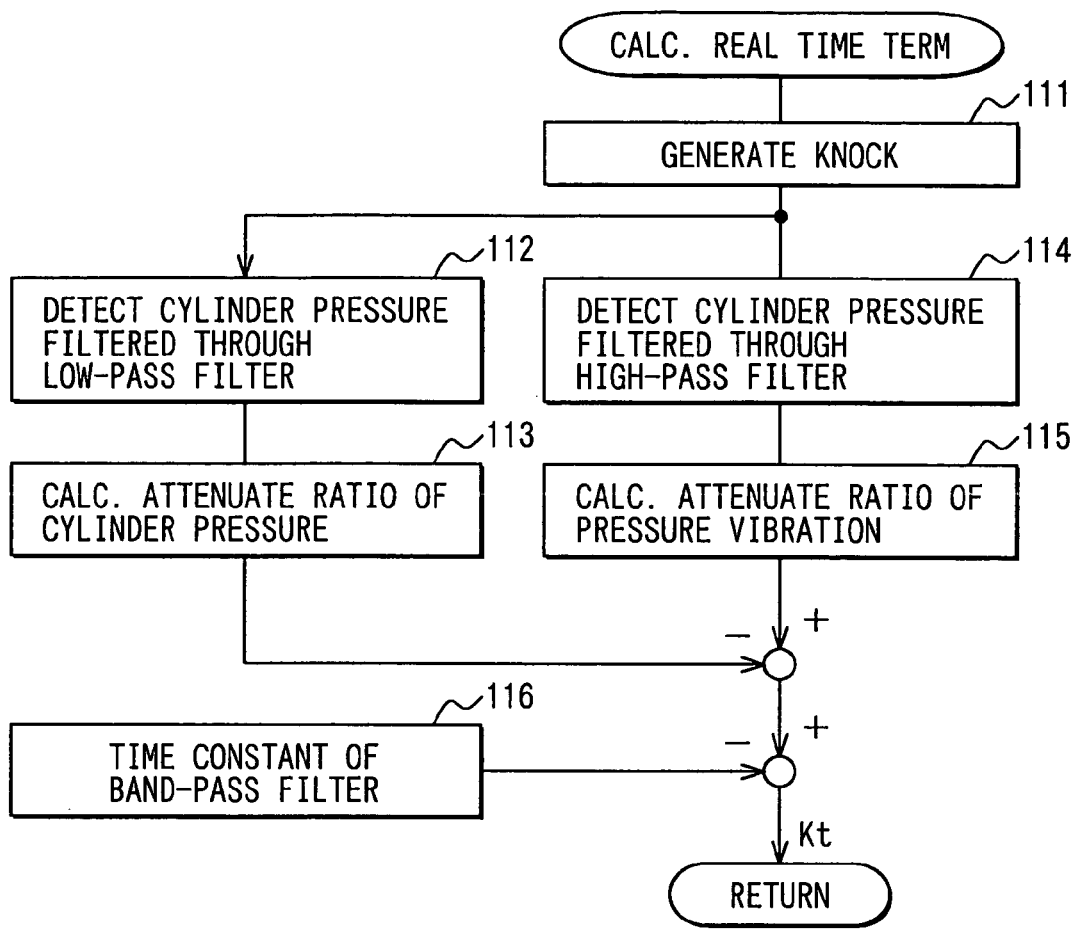
FIG. 3 is a flowchart showing a process of a real time term calculation routine.

FIG. 3 shows a routine of calculating the real time term Kt. At step 111, an engine knock is generated in the cylinder equipped with the cylinder pressure sensor 11. The cylinder pressure sensor signal is read, and the waveform of the cylinder pressure sensor signal at power stroke is detected in step 112. The high frequency noise is removed from the cylinder pressure sensor signal by the low-pass filter 12. Then, the attenuate ratio of the waveform of the cylinder pressure is calculated at step 113.

At step 114, the microcomputer reads the cylinder pressure sensor signal of which low frequency noise is removed by the high-pass filter 13, and detects-pressure vibration waveform due to the engine knock. At step 115, the attenuate ratio of the pressure vibration waveform is calculated. This attenuate ratio includes a factor depending on the crank angle and a factor depending on the real time. The factor depending on the crankshaft corresponds to cylinder pressure attenuation during moving down of the piston. The factor depending on the real time corresponds to an energy loss due to viscous friction. By removing the crank angle term Kca from the attenuate ratio of the pressure vibration waveform, the attenuate ratio depending on the real time (the real time term Kt) can be derived.

The band-pass filter 17 is used to derive a specific frequency of the engine knock in this embodiment. Thus, by including the time constant into the real time term Kt, the more precise ideal reference knock waveform can be determined at step 116.

(Calculate the Vibration Transfer Function)

Figure 4:
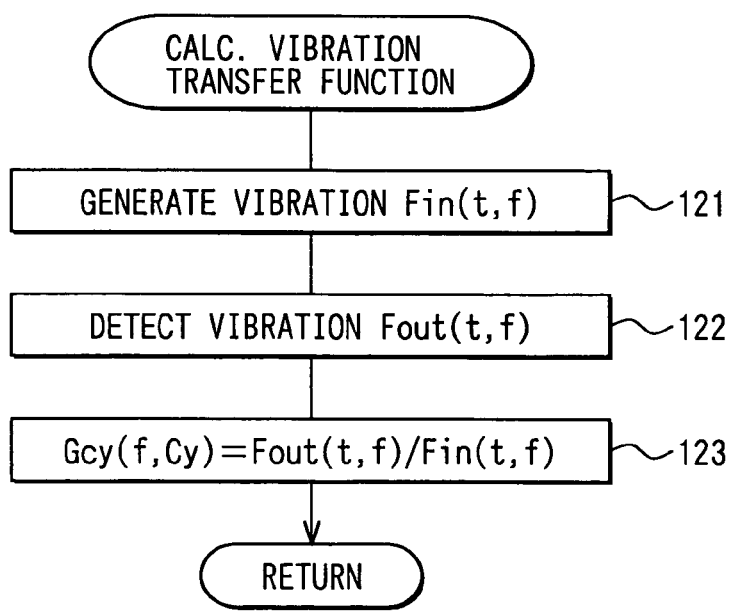
FIG. 4 is a flowchart showing a process of a vibration transfer function calculating routine.

The routine of calculating the vibration transfer function shown in FIG. 4 is executed on a bench with engine on. Each cylinder of the engine is provided with a vibration source therein. At step 121, the vibration source generates a vibration Fin (t, f) in each cylinder in series, which has almost the same frequency as that of knock vibration. Then, at step 122, a knock sensor signal Fout (t, f) is detected every cylinder. The vibration transfer function is calculated on the basis of a following equation at step 123.

$$Gcy(f, Cy) = Fout(t, f) / Fin(t, f)$$

(Knock Detecting)

Figure 5:
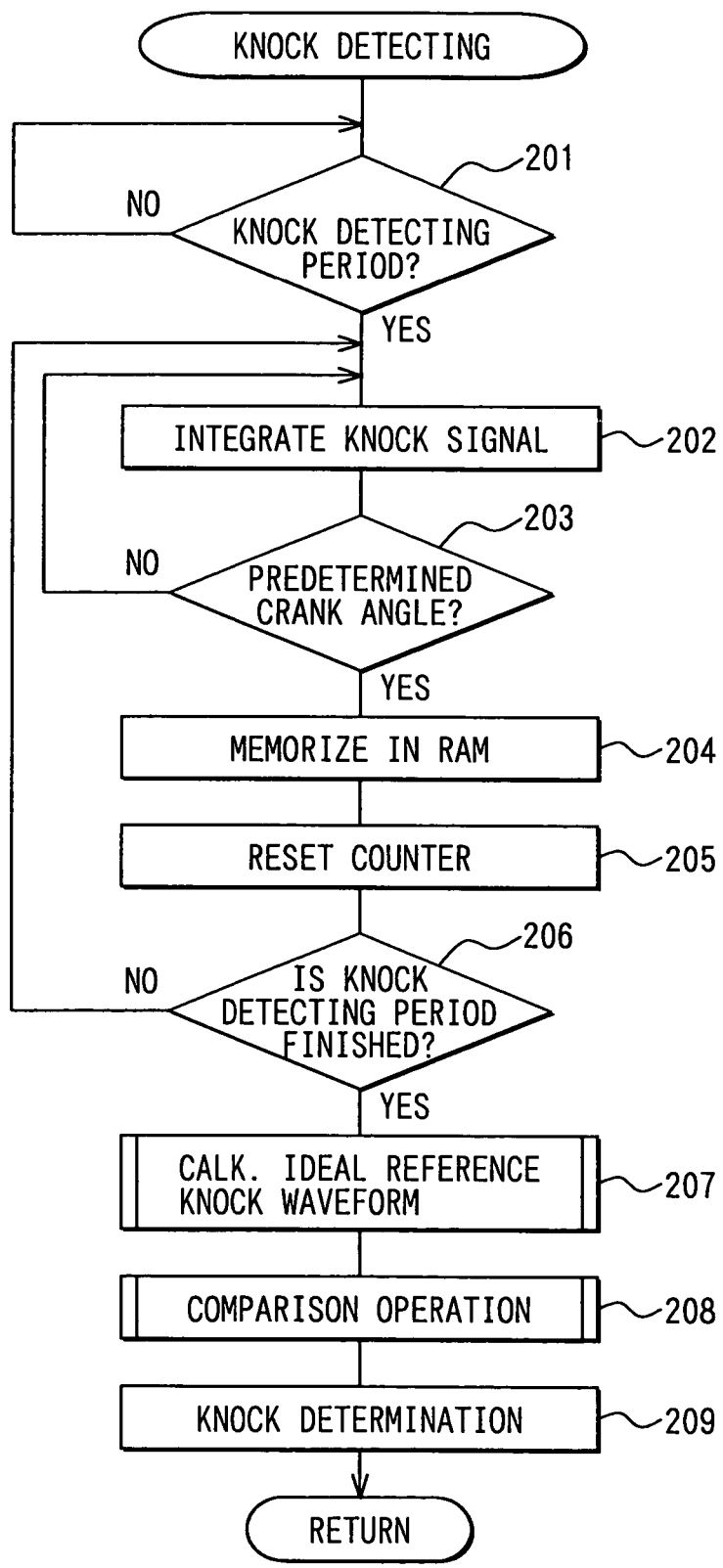
FIG. 5 is a flowchart showing a process of a knock determining routine.

The knock detecting routine shown in FIG. 5 is executed every ignition and functions as a knock detecting means. At step 201, it is determined whether or not knock detecting period starts. When the knock detecting period starts, it advances to step 202 in which knock sensor signals are integrated repeatedly until a period corresponding to predetermined crank angle (for example, 5° CA) elapses (step 203).

The integrated value of the knock sensor signal is memorized in RAM every crank angle 5° CA at step 204. A counter for integrating the knock sensor signal is reset at step 205, and the process of integrating the knock sensor signal is repeated again.

Figure 6:
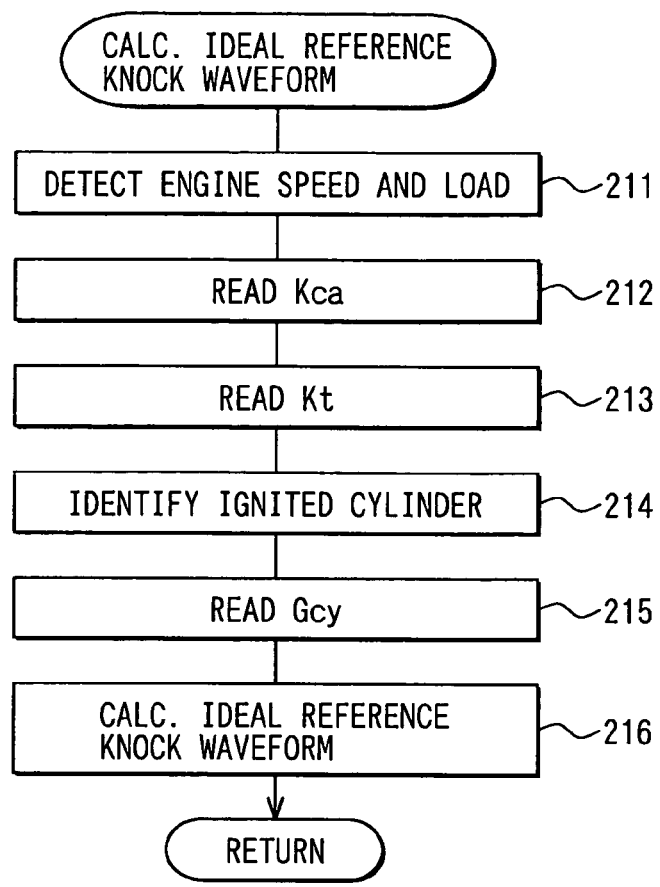
FIG. 6 is a flowchart showing a process of an ideal reference knock waveform calculating routine.
Figure 7:
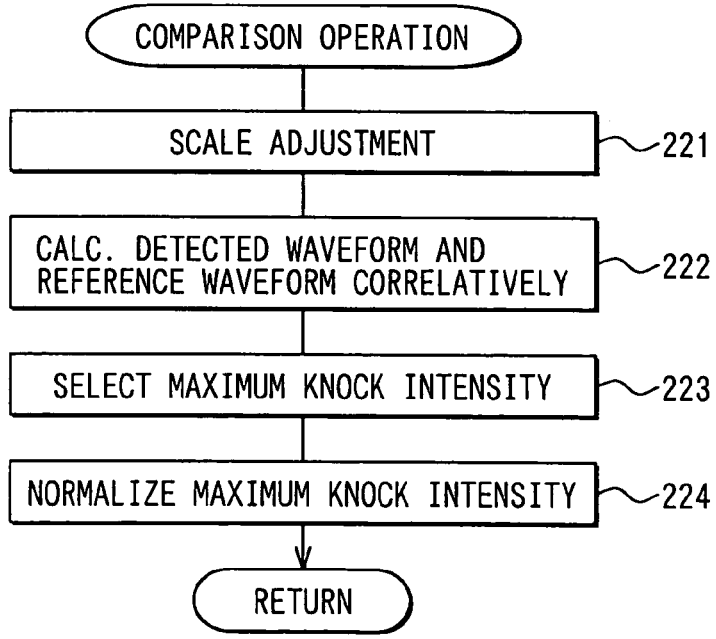
FIG. 7 is a flowchart showing a process of a comparison operation routine.

The process of integration described above is repeated until the knock detecting period is finished (step 206). When the knock detecting period is finished, a routine of calculating the ideal reference knock waveform shown in FIG. 6 is executed to calculate the ideal reference knock waveform at step 207. After that, a comparison operation routine shown in FIG. 7 is executed at step 208 to compare the detected knock waveform with the ideal reference knock waveform. The presence or absence of the engine knock is determined by comparing normalized maximum corrected knock strength with a knock detecting value at step 209. The normalized maximum corrected knock strength is calculated in the comparison operation routine.

(Calculating the Ideal Reference Knock Waveform)

A routine of calculating the ideal reference knock waveform shown in FIG. 6 is a subroutine which is executed at step 207 in FIG. 5. The microcomputer reads the present engine speed and engine load at step 212, and reads the crank angle term Kca indicative of the present engine speed and engine load, the crank angle term Kca being calculated in the routine shown in FIG. 2. It is advanced to step 213 in which the computer reads the real time term Kt calculated in the routine shown in FIG. 3.

The present ignited cylinder is identified at step 214, and the computer reads the vibration transfer function Gcy (f, Cy) of the present ignited cylinder. The vibration transfer function Gcy (f, Cy) is calculated in the routine shown in FIG. 4.

At step 216, the ideal reference knock waveform is calculated as follows. The rising waveform of the ideal reference knockwave form from a vibration starting time to a peak is defined as Minc, the attenuating waveform after the peak is defined as Mdec, the time constant of the band-pass filter 17 is defined as Tfil, the attenuate ratio of cylinder pressure due to sliding down of the piston is defined δp, the crank angle from the vibration starting point is defined as θ, and a peak position of the vibration is defined as θ0. The Minc depends on the time constant Tfil of the band-pass filter 17 and is expressed as following equation.

$$M\text{inc}(t) = 1 - \exp(-t/T\text{fil}) \quad (1)$$

When the engine speed is defined as N (rpm), the following equation between the crank angle θ(° CA) and time t (sec) is established. The engine speed is supposed to be substantially constant.

$$\theta = 6 \cdot N \cdot t \quad (2)$$

When the above equation (1) is converted into a function of the crank angle θ, thus the following equation is established.

$$M\text{inc}(\theta) = 1 - \exp\{-\theta/(6 \cdot N \cdot T\text{fil})\} \quad (3)$$

Similarly, in the attenuating waveform after the peak, the attenuate ratio δe is the real time term. The attenuate ratio with reference to the crank angle is δe/(6·N), and the real time term Kt is as follows.

In case of θ≦θ0:

$$Kt = 1 - \exp\{-\theta/(6 \cdot N \cdot T\text{fil})\}$$

In case of θ>θ0:

$$Kt = M\text{inc}(\theta 0) \cdot [\exp\{-\delta e/(6 \cdot N) \cdot (\theta - \theta 0)\}]$$

The crank angle term Kca affects the attenuating waveform. When the initial value of the crank angle term is set "1", the crank angle term Kca is expressed as follows.

$$K\text{ca} = \exp\{-(\delta p \cdot (\theta - \theta 0)\}$$

Therefore, the model waveform which is a composite waveform of the real time term Kt and the crank angle term Kca is expressed as follows.

$$M\text{inc}(\theta) = Kt$$
$$= 1 - \exp\{-\theta/(6 \cdot N \cdot T\text{fil})\}$$

-continued
$$M\text{dec}(\theta) = Kt \cdot K\text{ca}$$
$$= M\text{inc}(\theta 0) \cdot [\exp\{-\delta e/(6 \cdot N + \delta p) \cdot (\theta - \theta 0)\}]$$

When the engine knock is detected on the basis of vibration of the engine, the vibration transfer function is considered in order to express the idle waveform precisely. When a vibration is occurred in a cylinder cy, a relation between an input u (t) and an input y (t) is expressed as follows.

$$Y(t) = Gcy(t) \cdot (t)$$

In a manner similar to the actual time term, by converting the equation into the crank angle function Gcy (θ) with using the equation: t=θ/6N, and by multiplying with the actual time term and the crank angle term, the ideal reference knock waveform is expressed as follows.

$$M\text{inc}(\theta) = Gcy(\theta) \cdot Kt$$
$$= Gcy(\theta) \cdot [1 - \exp\{-\theta/(6 \cdot N \cdot T\text{fil})\}]$$
$$M\text{dec}(\theta) = Gcy(\theta) \cdot Kt \cdot K\text{ca}$$
$$= Gcy(\theta) \cdot M\text{inc}(\theta 0) \cdot \exp\{-\delta e/(6 \cdot N + \delta p) \cdot (\theta - \theta 0)\}$$

The comparison operation routine shown in FIG. 7 is the subroutine executed at step 208 shown in FIG. 5. At step 221, a scale adjustment is conducted between the detected knock waveform and the ideal reference knock waveform. At step 222, the detected knock waveform and the ideal reference knock waveform are calculated correlatively to derive the corrected knock intensity every frequency. The maximum corrected knock intensity is selected at step 223, and the maximum corrected knock intensity is divided by the noise intensity to normalize the maximum corrected knock intensity at step 224.

(the normalized maximum corrected knock intensity)
=(the maximum corrected knock intensity)/(the noise intensity)

According to the present embodiment, since the engine knock is detected by evaluating the relation between the detected knock waveform and the ideal reference knock waveform, the erroneous determination in which the noise is determined as the knock can be avoided so as to enhance the reliability of the knock determination. Furthermore, the ideal reference knock waveform is derived on the basis of the crank angle term Kca, the real time term Kt and the vibration transfer function Gcy and the ideal reference knock waveform is close to the actual knock wave form.

In the embodiment described above, the knock sensor 16 is disposed on the cylinder block of the engine. The knock sensor 16 can be displaced by a cylinder pressure sensor 11 in each cylinder. In such a case, the knock determination can be carried out by evaluating a relation between the output waveform from the cylinder pressure sensor and the ideal reference knock waveform, the output waveform being the detected knock waveform passed through the band-pass filter.

When the knock determination is conducted on the basis of the detected knock waveform from the cylinder pressure sensor 11, the ideal reference knock waveform can be calculated on the basis of the crank angle term Kca and the real time term without considering the vibration transfer function Gcy. In such a case, the ideal reference knock waveform can be calculated for each cylinder respectively, or the ideal reference knock waveform can be calculated as common waveform to every cylinder since dispersion of the knock waveform among the cylinders is relatively small.

When the present invention is applied to an engine having the knock sensor 16 and no cylinder pressure sensor 11, each routine shown in FIGS. 2 to 4 is executed by a personal computer and the crank angle term Kca, the actual time term Kt and the vibration transfer function Gcy are calculated during engine operation on the bench. These terms and function are memorized in ROM (non-volatile memory) of on-board computer. While the engine is operated, the on-board computer executes the ideal reference knock waveform calculation routine with reading the crank angle term Kca, the real time term Kt and the vibration transfer function which are memorized in ROM.

Alternatively, the crank angle term Kca, the real time term Kt and the vibration transfer function Gcy are calculated by a computer on the bench and the ideal reference knock waveform is calculated for each cylinder respectively. The ideal reference knock waveform is memorized in ROM of the on-board computer. When the knock determining routine shown in FIG. 5 is executed during the engine operation, the computer reads the ideal reference knock waveform corresponding to the present ignited cylinder and determines the engine knock by evaluating the relation between the ideal reference knock waveform and the detected knock waveform.

When the ideal reference knock waveform is memorized in ROM of the on-board computer in a system such that the knock determination is executed on the basis of the detected knock waveform from the cylinder pressure sensor 11, the common ideal reference knock waveform is memorized in the ROM of the on-board computer. The common ideal reference knock waveform is derived on the basic of the crank angle Kca and the actual time term Kt which are calculated on the bench. The ideal reference knock waveform can be calculated for each cylinder respectively.

What is claimed is:

1. A knock detecting apparatus for an internal combustion engine, comprising:
   a combustion condition detecting means for outputting a waveform signal indicative of a combustion condition of the engine;
   a calculating means for calculating an ideal reference knock waveform, and
   a knock determining means for evaluating a relation between the waveform signal and the ideal reference knock waveform to determine an engine knock by comparing the waveform signal with the ideal reference knock waveform during a specified period for a plurality of specified periods, wherein
   the calculating means calculates the ideal reference knock waveform on the basis of a factor depending on a crank angle and a factor depending on a real time.

2. The knock detecting apparatus for an internal combustion engine according to claim 1, wherein
   the calculating means executes a calculation on the basis of a cylinder pressure as the factor depending on the crank angle.

3. The knock detecting apparatus for an internal combustion engine according to claim 1, wherein
   the calculating means executes a calculation on the basis of an energy loss in a combustion chamber and a time constant of a band-pass filter for deriving a knock frequency component of the combustion condition detecting means.

4. A knock detecting apparatus for an internal combustion engine, comprising:
   a combustion condition detecting means for outputting a waveform signal indicative of a combustion condition of the engine;
   a memory memorizing an ideal reference knock waveform calculated in advance; and
   a knock determining means for evaluating a relation between the waveform signal and the ideal reference knock waveform to determine an engine knock by comparing the waveform signal with the ideal reference knock waveform during a specified period for a plurality of specified periods, wherein
   the ideal reference knock waveform is calculated on the basis of a factor depending on a crank angle and a factor depending on real time.

5. A knock detecting apparatus for an internal combustion engine, comprising:
   a knock vibration detecting means for outputting a waveform signal indicative of a vibration of a cylinder block of the engine;
   a calculating means for calculating an ideal reference knock waveform; and
   a knock determining means for evaluating a relation between the waveform signal and the ideal reference knock waveform to determine an engine knock by comparing the waveform signal with the ideal reference knock waveform during a specified period for a plurality of specified periods, wherein
   the calculating means calculates the ideal reference knock waveform on the basis of a factor depending on an engine construction, a factor depending on a crank angle and a factor depending on a real time.

6. The knock detecting apparatus for an internal combustion engine according to claim 5, wherein
   the calculating means executes a calculation on the basis of a cylinder block vibration transfer characteristic as the factor depending on the engine construction.

7. The knock detecting apparatus for an internal combustion engine according to claim 5, wherein
   the calculating means executes a calculation on the basis of a cylinder pressure as the factor depending on the crank angle.

8. The knock detecting apparatus for an internal combustion engine according to claim 5, wherein
   the calculating means executes a calculation on the basis of an energy loss in a combustion chamber and a time constant of a band-pass filter for deriving a knock frequency component as the factor depending on the real time.

9. A knock detecting apparatus for an internal combustion engine, comprising:
   a knock vibration detecting means for outputting a waveform signal indicative of vibration of a cylinder block of the engine;
   a memory memorizing an ideal reference knock waveform calculated in advance; and
   a knock determining means for evaluating a relation between the waveform signal and the ideal reference knock waveform to determine an engine knock by comparing the waveform signal with the ideal reference knock waveform during a specified period for a plurality of specified periods, wherein the ideal reference knock waveform is calculated on the basis of a factor depending on an engine construction, a factor depending on a crank angle and a factor depending on real time.

10. The knock detecting apparatus for an internal combustion engine according to claim 1, wherein
the factor depending on the real time is based at least on an energy loss in a combustion chamber of the internal combustion engine.

11. The knock detecting apparatus for an internal combustion engine according to claim 1, wherein
the factor depending on the real time is based at least on a time constant of a band-pass filter of the knock detecting apparatus.

12. The knock detecting apparatus for an internal combustion engine according to claim 5, wherein
the factor depending on the real time is based at least on an energy loss in a combustion chamber of the internal combustion engine.

13. The knock detecting apparatus for an internal combustion engine according to claim 5, wherein
the factor depending on the real time is based at least on a time constant of a band-pass filter of the knock detecting apparatus.

14. A method of detecting a knock in an internal combustion engine, the method comprising:
outputting a waveform signal indicative of a combustion condition of the engine;
calculating an ideal reference knock waveform; and
evaluating a relation between the waveform signal and the ideal reference knock waveform to determine an engine knock by comparing the waveform signal with the ideal reference knock waveform during a specified period for a plurality of specified periods;
wherein the ideal reference knock waveform is calculated on the basis of a factor depending on a crank angle and a factor depending on a real time.

15. The method according to claim 14, wherein the factor depending on the crank angle is a pressure in a cylinder of the internal combustion engine.

16. The method according to claim 14, wherein the factor depending on the real time is based at least on an energy loss in a combustion chamber of the internal combustion engine.

17. The method according to claim 14, wherein the factor depending on the real time is based at least on a time constant of a band-pass filter.

18. A method of detecting a knock in an internal combustion engine, the method comprising:
outputting a waveform signal indicative of a vibration of a cylinder block of the engine;
calculating an ideal reference knock waveform; and
evaluating a relation between the waveform signal and the ideal reference knock waveform to determine an engine knock by comparing the waveform signal with the ideal reference knock waveform during a specified period for a plurality of specified periods;
wherein the ideal reference knock waveform is calculated on the basis of a factor depending on an engine construction, a factor depending on a crank angle and a factor depending on a real time.

19. The method according to claim 18, wherein the factor depending on the crank angle is a pressure in a cylinder of the internal combustion engine.

20. The method according to claim 18, wherein the factor depending on the real time is based at least on an energy loss in a combustion chamber of the internal combustion engine.

21. The method according to claim 18, wherein the factor depending on the real time is based at least on a time constant of a band-pass filter.

22. A knock detecting apparatus for an internal combustion engine, comprising:
a combustion condition detecting means for outputting a waveform signal indicative of a combustion condition of the engine;
a calculating means for calculating an ideal reference knock waveform, and
a knock determining means for evaluating a relation between the waveform signal and the ideal reference knock waveform to determine an engine knock, wherein
the calculating means calculates the ideal reference knock waveform on the basis of a factor depending on a crank angle and a factor depending on a real time; and
the calculating means executes a calculation on the basis of an energy loss in a combustion chamber and a time constant of a band-pass filter for deriving a knock frequency component of the combustion condition detecting means.

23. A knock detecting apparatus for an internal combustion engine, comprising:
a knock vibration detecting means for outputting a waveform signal indicative of a vibration of a cylinder block of the engine;
a calculating means for calculating an ideal reference knock waveform; and
a knock determining means for evaluating a relation between the waveform signal and the ideal reference knock waveform to determine an engine knock, wherein
the calculating means calculates the ideal reference knock waveform on the basis of a factor depending on an engine construction, a factor depending on a crank angle and a factor depending on a real time; and
the calculating means executes a calculation on the basis of an energy loss in a combustion chamber and a time constant of a band-pass filter for deriving a knock frequency component as the factor depending on the real time.

24. A knock detecting apparatus for an internal combustion engine, comprising:
a combustion condition detecting means for outputting a waveform signal indicative of a combustion condition of the engine;
a calculating means for calculating an ideal reference knock waveform, and
a knock determining means for evaluating a relation between the waveform signal and the ideal reference knock waveform to determine an engine knock, wherein
the calculating means calculates the ideal reference knock waveform on the basis of a factor depending on a crank angle and a factor depending on a real time; and
the factor depending on the real time is based at least on an energy loss in a combustion chamber of the internal combustion engine.

25. A knock detecting apparatus for an internal combustion engine, comprising:
a knock vibration detecting means for outputting a waveform signal indicative of a vibration of a cylinder block of the engine;
a calculating means for calculating an ideal reference knock waveform; and a knock determining means for evaluating a relation between the waveform signal and the ideal reference knock waveform to determine an engine knock, wherein the calculating means calculates the ideal reference knock waveform on the basis of a factor depending on an engine construction, a factor depending on a crank angle and a factor depending on a real time; and the factor depending on the real time is based at least on an energy loss in a combustion chamber of the internal combustion engine.

26. A method of detecting a knock in an internal combustion engine, the method comprising:

outputting a waveform signal indicative of a combustion condition of the engine;

calculating an ideal reference knock waveform; and evaluating a relation between the waveform signal and the ideal reference knock waveform to determine an engine knock;

wherein the ideal reference knock waveform is calculated on the basis of a factor depending on a crank angle and a factor depending on a real time; and the factor depending on the real time is based at least on an energy loss in a combustion chamber of the internal combustion engine.

27. A method of detecting a knock in an internal combustion engine, the method comprising:

outputting a waveform signal indicative of a vibration of a cylinder block of the engine;

calculating an ideal reference knock waveform; and evaluating a relation between the waveform signal and the ideal reference knock waveform to determine an engine knock;

wherein the ideal reference knock waveform is calculated on the basis of a factor depending on an engine construction, a factor depending on a crank angle and a factor depending on a real time; and the factor depending on the real time is based at least on an energy loss in a combustion chamber of the internal combustion engine.

* * * * *